United States Patent [19]

Hayashi et al.

[11] 3,996,181

[45] Dec. 7, 1976

[54] AQUEOUS COMPOSITION CONTAINING ACRYLIC OR BUTADIENE POLYMERS

[75] Inventors: Toshio Hayashi, Hirakata; Tetsuo Moriya, Osaka, both of Japan

[73] Assignee: Nippon Gohsei Kagaku Kogyo Kabushiki Kaisha, Osaka, Japan

[22] Filed: May 20, 1975

[21] Appl. No.: 579,046

[30] Foreign Application Priority Data

May 25, 1974 Japan .............................. 49-59035

[52] U.S. Cl. ............ 260/29.6 RW; 260/29.6 WB; 260/29.6 WA; 260/29.6 SQ; 260/29.6 NR; 260/29.7 WA; 260/29.7 UP; 260/29.7 W; 260/29.7 NR; 260/29.7 RP

[51] Int. Cl.² ...................................... C08L 33/02

[58] Field of Search ... 260/8, 17 R, 17 A, 17.4 BB, 260/17.4 ST, 29.6 WB, 29.6 RW, 29.6 WA, 29.6 SQ, 29.6 NR, 29.7 WA, 29.7 UP, 29.7 W, 29.7 NR, 29.7 RP

[56] References Cited

UNITED STATES PATENTS

| | | | |
|---|---|---|---|
| 2,834,759 | 5/1958 | Austin | 260/29.6 SQ |
| 3,487,031 | 12/1969 | Muroi et al. | 260/29.6 RW |
| 3,637,563 | 1/1972 | Christena | 260/8 |
| 3,925,290 | 12/1975 | Matsuo et al. | 260/29.6 WA |

*Primary Examiner*—M. J. Welsh
*Attorney, Agent, or Firm*—Armstrong, Nikaido & Wegner

[57] ABSTRACT

Aqueous resinous composition comprising an emulsion of acrylic or butadiene polymers, which is prepared by emulsion polymerization in the presence of hydrolyzed vinyl acetate-alkali metal olefinsulfonate copolymer as an emulsifier, and a water-soluble polymeric material. The composition has excellent properties, particularly improved stability and good operation efficiency, and is applicable in wide uses, for instance, as binder, adhesive, textile treating agent and molded article.

6 Claims, No Drawings

AQUEOUS COMPOSITION CONTAINING ACRYLIC OR BUTADIENE POLYMERS

BACKGROUND OF THE INVENTION

The present invention relates to an aqueous resinous composition consisting of an emulsion and a water-soluble polymeric material.

A mixture of an aqueous emulsion of acrylic or butadiene polymers and a water-soluble polymeric material such as polyvinyl alcohol or starch has been availably employed as a clear coating material for paper, binder for pigment coating, treating agent for fibrous materials, adhesive, tackifier, paint or molding material for fibers and films. In accordance with the mixing ratio, it is possible to improve a quality of the emulsion or the polymeric material. For instance, by adding polyvinyl alcohol to the emulsion, the flow property of the emulsion can be improved and it becomes possible to obtain the flow property required in application such as coating or molding. In the case of polyvinyl alcohol, by adding the emulsion to polyvinyl alcohol, it becomes possible to raise the sizing effect to paper or fibrous materials, to give a water-resistant property, to improve the strength of molded article or to control the flexibility of molded article. An aqueous emulsion of acrylic or butadiene polymers has been generally prepared by subjecting monomers to emulsion polymerization in the presence of an emulsifier and an initiator in an aqueous medium, and it has been known that the emulsifier used in the polymerization has a great influence on the porperties of the resulting emulsion. As the emulsifier, nonionic or anionic surface active agents have been usually employed, and in some cases, in combination with polyvinyl alcohol as a protective colloid.

However, according to the investigation of the present inventors, it has been found that the mixture of the emulsion prepared in the presence of such an emulsifier and the water-soluble polymeric material has the disadvantages of poor storage property, especially at a high temperature, due to poor miscibility between the emulsion and the polymeric material, and of large dependence on shearing rate. The poor storage property increases the viscosity with the lapse of time and finally causes gelation or separation into layers and, therefore, it is impossible to storage the mixture for a long period of time. The large dependence on shearing rate makes it difficult to uniformly coat the mixture on surfaces of paper and, therefore, the coating requires severe process control. Also, the large dependence on shearing rate causes troubles in preparing molded articles from the mixture because the shape or construction of molded article is largely varied by a slight changing of a molding speed at a nozzle or slit of a molding machine. Thus, the known mixtures are not necessarily satisfactory.

OBJECTS OF THE INVENTION

It is an object of the present invention to provide a novel aqueous resinous composition consisting of an aqueous emulsion of acrylic or butadiene polymers and a water-soluble polymeric material.

A further object of the invention is to provide the composition being stable for a long period of time and having good operation efficiency.

A still further object of the invention is to provide the composition being advantageously applicable to wide uses.

These and other objects of the invention will become apparent from the description hereinafter.

DETAILED DESCRIPTION

It has now been found that an aqueous resinous composition consisting essentially of an aqueous emulsion of acrylic or butadiene homo- or co-polymer prepared by emulsion-polymerizing monomers in the presence of a modified polyvinyl alcohol (hereinafter referred to as modified PVA) containing 0.5 to 7% by mole of an alkali metal olefinsulfonate unit as an emulsifier, and a water-soluble polymeric material has excellent properties and effects, and the defects of a conventional composition, namely poor storage property and large dependence on shearing rate, can be improved by such an aqueous resinous composition.

The objects of the present invention can be attained only when the specific modified PVA, namely partially or completely hydrolyzed copolymer of vinyl acetate and alkali metal olefinsulfonate, is employed as the emulsifier in preparing the emulsion of acrylic or butadiene polymers and the emulsion and the water-soluble polymeric material are admixed in a ratio of a solid content of the emulsion to the polymeric material of 1 : 9 to 9 : 1 by weight. The modified PVA containing less than 0.5% by mole of alkali metal olefinsulfonate is substantially similar to polyvinyl alcohol and the emulsion prepared in the presence of such a modified PVA can not give the composition of the invention. On the other hand, the employment of the modified PVA containing more than 7% by mole of the alkali metal olefinsulfonate in the preparation of emulsion results in the broad distribution of polymer particle size of the emulsion and such an emulsion is poor in miscibility with the polymeric material. Therefore, it is necessary to employ the modified PVA containing the alkali metal olefinsulfonate unit within the range of 0.5 to 7% by mole, preferably within the range of 1 to 4% by mole.

The modified PVA employed as the emulsifier in the present invention is generally prepared by copolymerizing vinyl acetate monomer and alkali metal salt of olefinsulfonic acid monomer in the presence of a known radical polymerization initiator and then partially or completely hydrolyzing the resulting copolymer in a conventional method. In the present invention, there is advantageously employed the modified PVA prepared by copolymerizing the monomers in the absence of a solvent or in the presence of an alcohol in an amount of not more than 40% by weight of the total weight of polymerization system and then hydrolyzing the resulting copolymer. Examples of the alcohol employed in the preparation of the modified PVA are lower alkyl alcohols having 1 to 4 carbon atoms such as methanol, ethanol, propanol and butanol. These alcohol solvents may contain water not more than 25% by weight. Examples of the alkali metal olefinsulfonate employed in the preparation of the modified PVA are alkali metal salts of olefinsulfonic acid such as vinylsulfonic acid, allylsulfonic acid and 2-methylallylsulfonic acid. As the alkali metal, litium, sodium and potassium are suitable. Especially, sodium salts of olefinsulfonic acid are preferably employed in the preparation of the modified PVA.

In preparing the emulsion, the modified PVA having a degree of hydrolysis in vinyl acetate unit of not less than 65% by mole, preferably not less than 80% by mole is suitably employed as the emulsifier. The optimum degree of hydrolysis of the modified PVA may be decided within the above range in accordance with the requirement for the aqueous resinous composition. For instance, when the emulsion prepared by employing the modified PVA having a degree of hydrolysis of not less than 95 % by mole, especially not less than 98 % by mole, is admixed with the polymeric material, the obtained composition has the excellent flow property. Also, the emulsion prepared by employing the modified PVA having a degree of hydrolysis of 80 to 90 % by mole has a high viscosity and, therefore, it has the advantages that there is no necessity of increasing the viscosity by means of an alkali or a thickener.

The emulsion of acrylic or butadiene polymer is prepared by polymerizing monomers in the presence of the modified PVA as the emulsifier and a polymerization initiator in an aqueous medium according to a conventional emulsion polymerization method. That is to say, any conventional method can be employed except that the modified PVA is employed as the emulsifier. In general, the emulsion polymerization is carried out in an aqueous medium in an amount of 40 to 65% by weight to the monomer at a temperature of 35° to 90° C. with agitation. As the polymerization initiator, there may be known water-soluble initiators such as potassium persulfate or ammonium persulfate, and known redox polymerization initiators such as potassium persulfate-sodium hydrogensulfite, ammonium persulfate-sodium hydrogensulfite, hydrogen peroxide-tartaric acid, hydrogen peroxide-iron salt, hydrogen peroxide-ascorbic acid-iron salt, hydrogen peroxide-formaldehyde sodium sulfoxylate dihydrate, hydrogen peroxide-formaldehyde sodium sulfoxylate dihydrate-iron salt, and the like.

The amount of the modified PVA, namely hydrolyzed vinyl acetate-alkali metal olefinsulfonate copolymer, varies to some extent in compliance with the degree of modification of the modified PVA or the desired polymer content of the obtained emulsion. Usually the amount is selected from 1 to 5% by weight per the total weight of polymerization system. The modified PVA may also be employed in combination with a nonionic surface active agent such as polyoxyethylene-alkyl ethers, polyoxyethylene-alkyl phenols or polyhydric esters, or an anionic surface active agent such as higher alcohol sulfates. Further, a plasticizer such as phthalates or phosphates, or a pH controlling agent such as sodium carbonate, sodium acetate or sodium phosphate may also be employed in the emulsion polymerization.

In the present invention, the aqueous emulsions are limited to those of the specific polymers, i.e. acrylic polymers and butadiene polymers. Examples of the monomer to be polymerized are acrylic monomers such as methyl, ethyl, propyl, butyl, 2-ethylhexyl and 2-hydroxyethyl acrylates, methyl, ethyl, propyl, butyl, 2-ethylhexyl and 2-hydroxyethyl methacrylates, acrylonitrile, methacrylonitrile, acrylamide, methacrylamide, acrylic acid, methacrylic acid, N-methylolacrylamide and N-methylolmethacrylamide, and butadiene monomers such as butadiene-1,3, 2-methylbutadiene-1,3, 2,3-dimethylbutadiene-1,3, 2-chlorobutadiene-1,3, and the like. These monomers are employed alone or in a mixture thereof, and also employed in combination with a small amount of another copolymerizable monomer such as styrene and vinyl acetate. Typical examples of the combination of the above monomers employed to produce copolymers are butyl acrylate and styrene, butyl acrylate and 2-ethylhexyl acrylate, butyl acrylate and vinyl acetate, butyl acrylate and methyl methacrylate, butyl acrylate and acrylic acid, butadiene-1,3 and styrene, butadiene-1,3 and styrene and acrylic acid, butadiene-1,3 and styrene and methacrylic acid, butadiene-1,3 and acrylonitrile, butadiene-1,3 and acrylonitrile and styrene, butadiene-1,3 and acrylonitrile and acrylic acid, butadiene-1,3 and acrylonitrile and methacrylic acid, butadiene-1,3 and methyl methacrylate, butadiene-1,3 and methyl methacrylate and acrylic acid, and butadiene-1,3 and methyl methacrylate and methacrylic acid. In the case of preparing an emulsion of butadiene copolymers, monomers are suitably employed so as to give a copolymer containing 50 to 90% by mole of butadiene unit, preferably 55 to 80% by mole of butadiene unit in the copolymer.

In general, the emulsion so prepared has a solid content of 30 to 60% by weight, a viscosity of 10 to 10,000 cP and a structural viscosity index of 0.05 to 1.0. Also, the particle size of polymer in the emulsion falls within the range of 50 to 250 m$\mu$.

The aqueous emulsion so obtained is then admixed with the water-soluble polymeric material, and if desired, after dilution or concentration. The polymeric material is admixed in a form of aqueous solution or powder. Upon admixing them, heating is not necessarily required, and both emulsion and polymeric material are admixed at a normal temperature with enough agitation. If desired, both are admixed at a temperature of 50° to 95° C. It is essential for the present invention that the weight ratio of the solid content of the emulsion to the polymeric material falls within the range of 1 : 9 to 9 : 1, preferably 2 : 8 to 8 : 2. Out of the above range, it is difficult to uniformly blend both emulsion and polymeric material. According to the use of the prepared resinous composition, the mixing ratio may be varied within the above range. In the case of employing the composition as a binder for pigment coating, adhesive or tackifier for aluminum foils and plastics, coating material, textile treating agent for flocking, binder for non-woven fabrics or modifier for building materials, the mixing ratio is advantageously selected from 6 : 4 to 8 : 2. Also, in the case of employing the composition as a clear coating material for papers, adhesive or tackifier for woods, clothe or papers, textile treating agent for sizing or hard finishing, fibril bond or warp size, the mixing ratio is advantageously selected from 4 : 6 to 2 : 8.

Examples of the water-soluble polymeric material admixed with the emulsion are polyvinyl alcohol having a degree of hydrolysis of not less than 50% by mole and derivatives thereof, starches such as raw starch, oxidized starch, dextrin, dialdehyde starch and hydroxyethyl starch, methyl cellulose, carboxymethyl cellulose, hydroxymethyl cellulose, hydroxyethyl cellulose, polyethylene oxide, polyvinyl pyrrolidone, polyacrylic acid, alkali or ammonium salts of polyacrylic acid, polyacrylamide, casein, and the like.

Examples of the polyvinyl alcohol derivatives are acetalizated polyvinyl alcohol, hydrolyzed copolymers of vinyl acetate and an olefin such as ethylene or propylene, hydrolyzed copolymers of vinyl acetate and an ethylenically unsaturated carboxylic acid such as maleic acid, crotonic acid, acrylic acid, methacrylic acid, acrylamide or methacrylamide and hydrolyzed copolymers of vinyl acetate and olefinsulfonic acid such as vinyl sulfonic acid, allylsulfonic acid or 2-methylallylsulfonic acid.

According to the present invention, the composition may be added with an organic solvent in an amount not causing demulsification.

The aqueous resinous composition of the present invention is industrially very available, and can be widely applied to uses such as binders for pigment coating, clear coating materials for papers, adhesives or tackifiers for woods, papers, cloths, aluminum foils or plastic films, coating materials for interior, exterior or strippable paint, textile treating agents for flocking, sizing or hard finishing, binders for pigment printing, binders for molded articles such as films, sheets and fibers or non-woven fabrics, fibril bonds, sizing agents for hydrophobic fibers such as polyester fiber, remoistenable adhesives, and modifiers for building materials such as mortar, concrete and asphalt.

The aqueous resinous composition of the invention may also contain other agents depending upon the use. For instance, in the case of employing the composition as a paper treating agent, there may be added an inorganic pigment such as clay, calcium carbonate, titanium oxide and satin white, dispersing agent, anti-foaming agent or curing agent. In the case of employing the composition as an adhesive or trackifier, there may be added a filler or curing agent. In the case of employing the composition as a coating material, there may be added a pigment, dispersing agent for pigment, wetting agent, thickener, stabilizer for film forming, anti-foaming agent or rust inhibitor. In the case of employing the composition as a textile treating agent, there may be added a curing agent, pigment, dispersing agent or anti-foaming agent. In the case of employing the composition as a molding material, there may be added a plasticizer, anti-oxidant, lubricant, filler or curing agent.

The present invention is more particularly described and explained by means of the following illustrative Examples, in which all parts and % are parts by weight and % by weight unless otherwise stated.

EXAMPLE 1 AND CONTROL 1

A glass polymerization vessel equipped with a reflux condenser, a dropping funnel, a thermometer and a stirrer was charged with 395 parts of vinyl acetate, 186 parts of methanol, 27 parts of sodium allylsulfonate and 0.2% by mole of azobisisobutyronitrile per mole of the vinyl acetate. After carrying out the polymerization at a temperature of 60° to 65° C. for 8 hours, the residual vinyl acetate was removed by a conventional method to give vinyl acetate-sodium allylsulfonate copolymer containing 3.0% by mole of sodium allylsulfonate unit. Then the copolymer was hydrolyzed by a conventional method to give a modified PVA of which degree of hydrolysis in vinyl acetate unit was 98.5% by mole.

A glass polymerization vessel equipped with a reflux condenser, a dropping funnel, a thermometer and a stirrer was charged with 138.4 parts of 3.9% aqueous solution of the modified PVA and 9 parts of 9% aqueous solution of sodium secondary phosphate as a pH controlling agent, and the temperature was elevated to 65° C. with agitation at the rate of 200 r.p.m. Then the vessel was charged with 11 parts of butyl acrylate and 10 parts of 4% aqueous solution of potassium persulfate and emulsion polymerization was initiated. After the initial polymerization for 35 minutes, the polymerization was further carried out for 4 hours at 70° C. During the polymerization, 98.1 parts of butyl acrylate was continuously added dropwise for 4 hours and 3.5 parts of 4% aqueous solution of potassium persulfate was added in two portions. Thereafter, the polymerization was further continued for one hour with maintaining the temperature at 75° C. to complete the polymerization, and then the residual monomer was removed to give an emulsion of polybutyl acrylate having a solid content of 38%.

To 100 parts of the emulsion so prepared, 100 parts of 10% aqueous solution of polyvinyl alcohol (Degree of hydrolysis: 98.5% by mole, Degree of polymerization: 1,700) was added, and then both were uniformly admixed to give an aqueous resinous composition. The properties of the composition so obtained are shown in Table 1.

As Control 1, the same procedure as in Example 1 was repeated except that a combination of 2.7 parts of nonionic surface active agent (commercially available under the registered trademark "Nissan Nonion P-230" made by Nippon Oils and Fats Co., Ltd.) and 0.8 part of anionic surface active agent (commercially available under the registered trademark "Nissan Trax H-45" made by Nippon Oils and Fats Co., Ltd.) was employed as the emulsifier instead of the modified PVA in the preparation of emulsion. The results thereof are also shown in Table 1.

Table 1

| | Viscosity change with the lapse of time | | Dependence on shearing rate | |
|---|---|---|---|---|
| | Lapsed time | Falling time | Number of revolution | Viscosity |
| | hour | second | r.p.m. | cP |
| Example 1 | 2 | 45 | 6 | 220 |
| | 6 | 47 | 12 | 200 |
| | 12 | 52 | 30 | 180 |
| | 24 | 55 | 60 | 170 |
| | 36 | 59 | — | — |
| Control 1 | 2 | 45 | 6 | 3,800 |
| | 6 | 74 | 12 | 2,000 |
| | 12 | 140 | 30 | 1,100 |
| | 24 | Gelation (White precipitate in part) | 60 | 700 |
| | 36 | Gelation | — | — |

(Note 1) The viscosity change with the lapse of time was shown, employing the compositon whose solid content was 20%, by measuring the time required in the falling of a steel ball of 1/8 inch in diameter through the composition at a height of 50 cm. charged in a vessel.

(Note 2) The dependence on shearing rate was measured, employing the composition whose solid content was 20%, by a Brookfield viscometer.

The composition of the invention was applied on the back of an aluminum foil. The solid weight of the composition applied on the foil was 3.0 g./m². Then the paper board was put thereon and adhered at a temperature of 80° C. under pressure. The adhesive strength under a normal condition was 1.17 kg./25 cm.

EXAMPLES 2 TO 6 AND CONTROLS 2 AND 3

The same procedure as in Example 1 was repeated except that the emulsion prepared by employing the modified PVA shown in Table 2 was employed instead of the emulsion employed in Example 1.

The results are shown in Table 2.

20% to give a spinning solution. The solution so prepared was spun by a usual wet spinning machine for polyvinyl alcohol fiber. The solution was extruded from a nozzle into a saturated aqueous solution of sodium sulfate to coagulate. After stretching the resulting fiber to five times, the fiber was heat-treated at a temperature of 220° C. for 100 seconds, and was subjected to Table 2

| | Modified PVA | | |
|---|---|---|---|
| | *Methanol : Monomer by weight | Sodium allylsulfonate content % by mole | Degree of hydrolysis in vinyl acetate unit % by mole |
| Example 2 | 5 : 95 | 1.5 | 98.5 |
| Example 3 | 10 : 90 | 2.0 | 90.1 |
| Example 4 | 25 : 75 | 2.7 | 99.0 |
| Example 5 | 30 : 70 | 3.5 | 88.5 |
| Example 6 | 90 : 10 | 2.0 | 98.5 |
| Control 2 | 50 : 50 | 0.3 | 98.3 |
| Control 3 | 30 : 70 | 9.1 | 98.5 |

| | Viscosity change with the lapse of time (Falling time) Lapsed time (hour) | | | | | Dependence on shearing rate (Viscosity) Number of revolution (r.p.m.) | | | | |
|---|---|---|---|---|---|---|---|---|---|---|
| | 2 | 6 | 12 | 24 | 36 | 6 | 12 | 30 | 60 | 120 |
| | second | | | | | cP | | | | |
| Example 2 | 47 | 50 | 57 | 60 | 67 | 320 | 310 | 300 | 280 | 240 |
| Example 3 | 65 | 69 | 73 | 79 | 83 | 470 | 420 | 380 | 350 | 290 |
| Example 4 | 45 | 48 | 52 | 56 | 60 | 220 | 205 | 185 | 172 | 164 |
| Example 5 | 57 | 60 | 67 | 71 | 79 | 440 | 400 | 360 | 340 | 270 |
| Example 6 | 25 | 30 | S | S | S | 150 | 140 | 135 | 127 | — |
| Control 2 | S | S | S | S | S | Measurement is impossible due to separation into layers. | | | | |
| Control 3 | 20 | S | S | S | S | Measurement is impossible due to separation into layers. | | | | |

(Note) In Table, reference "S" shows the separation into layers
*"Methanol : Monomer" shows the ratio of methanol to monomer in copolymerizing vinyl acetate and sodium allylsulfonate.

EXAMPLE 7

The same procedure as in Example 1 was repeated except that the emulsion prepared in the presence of the hydrolyzed vinyl acetate-sodium 2-methallylsulfonate copolymer (Degree of hydrolysis: 98.5% by mole) instead of the hydrolyzed vinyl acetate-sodiumallylsulfonate copolymer was employed.

The results were similar to those obtained in Example 1.

EXAMPLES 8 TO 13

The same procedure as in Example 1 was repeated except that various emulsions were prepared by polymerizing the monomer shown in Table 3 instead of butyl acrylate and each emulsion was admixed with polyvinyl alcohol in the ratio shown in Table 3.

The results are shown in Table 3.

formalization in a bath containing 60 g./liter of formaldehyde, 250 g./liter of sulfuric acid and 300 g./liter of sodium sulfate at a temperature of 70° C. The characteristics of the obtained fiber were as follows:

Heat stretching ratio: 70%
Fiber fineness: 4.2 d.
Strength: 2.8 g./d.
Elongation: 30%

Employing the aqueous resinous composition obtained in Example 10 consisting of the styrene-butyl acrylate copolymer emulsion and polyvinyl alcohol, a film was prepared as follows: To 100 parts of the composition, 1.5 parts of glycerin and 0.02 part of a releasing agent were added, and from the resulting composition a film having a thickness of 0.05 mm. was formed by means of a casting method. The strength and elonga- Table 3

| | Monomer | | Mixing Ratio* Emulsion : PVA | Viscosity change with the lapse of time (Falling time) Lapsed time (hour) | | | | Dependence on shearing rate (Viscosity) Number of revolution (r.p.m.) | | | | |
|---|---|---|---|---|---|---|---|---|---|---|---|---|
| | Kind | Amount part by weight | by weight | 2 | 12 | 24 | 36 | 6 | 12 | 30 | 60 | 120 |
| | | | | second | | | | cP | | | | |
| Example 8 | Acrylonitrile | 110 | 4 : 6 | 45 | 52 | 55 | 59 | 650 | 600 | 580 | 520 | 500 |
| Example 9 | Methyl methacrylate | 110 | 5 : 5 | 46 | 51 | 60 | 67 | 920 | 880 | 820 | 750 | 680 |
| Example 10 | Butyl acrylate Styrene | 60 40 | 5 : 5 | 45 | 50 | 56 | 60 | 930 | 820 | 760 | 680 | 580 |
| Example 11 | Styrene Acrylonitrile Methyl methacrylate | 55 55 90 | 5 : 5 | 47 | 51 | 57 | 62 | 705 | 685 | 650 | 620 | 600 |
| Example 12 | Ethyl acrylate N-methylolacrylamide | 15 5 | 3 : 7 | 57 | 64 | 69 | 71 | 1450 | 1360 | 1180 | 1150 | 1050 |
| Example 13 | Butyl acrylate Styrene Methyl methacrylate | 65 25 10 | 7 : 3 | 38 | 42 | 47 | 50 | 200 | 180 | 170 | 160 | 140 |

*"Mixing ratio" shows the ratio of the solid content of emulsion to polyvinyl alcohol.

The concentration of the aqueous resinous composition obtained in Example 8 consisting of the polyacrylonitrile emulsion and polyvinyl alcohol was adjusted to tion of the obtained film were 3.5 kg./mm.$^2$ and 330%, respectively, and also the transparency of the film was favorable.

The aqueous resinous composition obtained in Example 12 consisting of the methyl methacylate-ethyl acrylate-N-methylolacrylamide terpolymer emulsion and polyvinyl alcohol was employed as a treating agent for hard finishing. To 500 parts of the composition, 5 parts of a curing agent (commercially available under the registered trademark "Sumitex M-3" made by Sumitomo Chemical Co., Ltd.) and 0.5 part of a curing accelerator (commercially available under the registered trademark "Sumitex ACX" made by Sumitomo Chemical Co., Ltd) were added. Into the resulting composition, a cotton cloth was dipped. The amount of the solid component of the composition adhered to the cloth was 32 g./m$^2$. The dipped cloth was pre-dried at a temperature of 100° C. for 3 minutes and then the curing was carried out at a temperature of 140° C. for 5 minutes. Favorable hard finishing was possible.

To prepare a glazing varnish, 8 parts of trimethylolmelamine was added to 500 parts of the aqueous resinous composition obtained in Example 13 consisting of the methyl methacrylate-styrene-butyl acrylate terpolymer emulsion and polyvinyl alcohol. The varnish was coated on untreated surfaces of a printed plywood in an amount of 12 g./m.$^2$ as a solid component. After drying at a temperature of 100° C. for one minute, the plywood coated was subjected to hot press. The state of the coating film was favorable.

EXAMPLES 14 TO 18

The same procedure as in Example 1 was repeated except that each water-soluble polymeric material shown in Table 4 was employed instead of polyvinyl alcohol and was admixed with the emulsion in the mixing ratio shown in Table 4.

emulsion polymerization as in Example 1 was carried out. The solid content of the obtained polybutyl acrylate emulsion was 38.7%.

To 100 parts of the emulsion, 100 parts of a 10% aqueous solution of polyvinyl alcohol having a degree of hydrolysis of 99.2% by mole and a degree of polymerization of 1,650 was added and admixed. The properties of the composition so obtained were similar to those of the composition obtained in Example 1.

EXAMPLE 20 AND CONTROLS 4 AND 5

A glass polymerization vessel equipped with a reflux condenser, a dropping funnel, a thermometer and a stirrer was charged with 430 parts of vinyl acetate, 215 parts of methanol, 30 parts of sodium allylsulfonate and 0.20% by mole of azobisisobutylonitrile per mole of the vinyl acetate. After carrying out the polymerization at a temperature of 60° to 65° C. for 8 hours, the residual vinyl acetate was removed by a conventonal method to give vinyl acetate-sodium allylsulfonate copolymer containing 2.5% by mole of sodium allylsulfonate unit. Then the copolymer was hydrolyzed by a conventional method to give a modified PVA of which degree of hydrolysis in vinyl acetate unit was 98.5% by mole.

A glass lining steel autoclave (resistant to 20 kg./cm.$^2$ in pressure and equipped with a turbine type agitator) was charged with 3,200 parts of water, 3,200 parts of 4% aqueous solution of the modified PVA, 15 parts of n-dodecyl mercaptan as a controlling agent for molecular weight and 900 parts of styrene. Then 2,100 parts of butadine-1,3 was introduced into the vessel through a pressure-resistant gauge, and the inner temperature was elevated to 60° C. with agitation at the rate of 120 r.p.m. Further 400 parts of 5% aqueous solution of potassium persulfate was introduced into the vessel by a pressure-resistant reciprocating pump to initiate the emulsion polymerization. An inner pressure of 4.5

Table 4

| | Water-soluble polymeric material | Mixing ratio* | Viscosity change with the lapse of time (Falling time) | | | | Dependence on shearing rate (Viscosity) | | | |
|---|---|---|---|---|---|---|---|---|---|---|
| | Kind | Emulsion : polymeric material | Lapsed time (hour) | | | | Number of revolution (r.p.m.) | | | |
| | | | 2 | 12 | 24 | 36 | 6 | 12 | 30 | 60 |
| | — | by weight | second | | | | cP | | | |
| Example 14 | Methyl cellulose | 3.5 : 6.5 | 82 | 82 | 84 | 88 | 2500 | 2300 | 2000 | 1900 |
| Example 15 | Carboxymethyl cellulose | 3.5 : 6.5 | 50 | 50 | 56 | 60 | 740 | 710 | 700 | 680 |
| Example 16 | Oxidized starch | 3.5 : 6.5 | 20 | 20 | 22 | 23 | 40 | 38 | 35 | 33 |
| Example 17 | Dextrin | 3.5 : 6.5 | 34 | 35 | 37 | 39 | 70 | 68 | 66 | 64 |
| Example 18 | Hydroxyethyl cellulose | 3.5 : 6.5 | 132 | 135 | 137 | 142 | 21500 | 20000 | 18050 | 16700 |

*"Mixing ratio" shows the ratio of the solid content of emulsion to water-soluble polymeric material.
(Note) The solid content of the composition employed in measurement is 7.5 %.

EXAMPLE 19

The same polymerization vessel as in Example 1 was charged with 320 parts of vinyl acetate, 130 parts of methanol, 15 parts of a 30% aqueous solution of sodium ethylenesulfonate and 0.2% by mole of azobisisobutylonitrile per mole of the vinyl acetate. After carrying out the polymerization at a temperature of 60° to 65° C. for 8 hours, the residual vinyl acetate was removed by a conventional method to give vinyl acetate-sodium ethylenesulfonate copolymer containing 2.3% by mole of sodium ethylenesulfonate unit. Then the copolymer was hydrolyzed by a conventional method to give a modified PVA of which degree of hydrolysis in vinyl acetate unit was 98.0% by mole. Employing the modified PVA so prepared, the same kg./cm.$^2$ at the beginning of the polymerization dropped with the progress of the polymerization. After 7 hours, 150 parts of 4% aqueous solution of potassium persulfate was further added and the polymerization was continued. To terminate the polymerization, hydroquinone was added to the vessel 12 hours later from the beginning of the polymerization. The inner pressure was 3.0 kg./cm.$^2$ The emulsion of butadiene-1,3-styrene copolymer containing 70% by mole of butadiene unit was obtained.

After adjusting the concentration of the emulsion so prepared to 35%, the emulsion was admixed with an equal amount of a 10% aqueous solution of a hydrolyzed vinyl acetate-maleic acid copolymer (Degree of hydrolysis: 99.5% by mole, maleic acid content: 5% by mole, Degree of polymerization: 1,700) to give an aqueeous resinous composition. The properties of the composition so prepared are shown in Table 5.

As Control 4, the same procedure as above was repeated except that a combination of sodium diisobutylnaphthalenesulfonate and sodium lauryl sulfate was employed instead of the modified PVA in the preparation of the emulsion. As Control 5, the same procedure as above was further repeated except that a combination of 60 parts of polyvinyl alcohol of which degree of hydrolysis was 88% by mole, 30 parts of nonionic surface active agent (commercially available under the registered trademark "Nissan Nonion P-230" made by Nippon Oils and Fats Co., Ltd.) and 30 parts of anionic surface active agent (commercially available under the registered trademark "Nissan Trax H-45" made by Nippon Oils and Fats Co., Ltd.) was employed instead of the modified PVA in the preparation of the emulsion. These results are also shown in Table 5.

to give a sizing paper. The surface strength, sizing degree and oil absorption power were respectively 252 cm./sec., 19.7 sec. and 79 sec., which were measured as follows:

Surface strength: Employing IGT printability testing machine, the surface strength was measured under the conditions of B-tension, 35 kg. in printing pressure and 17 in tack value.

Sizing degree: Stoechight sizing degree was measured according to the provision of JIS P 8115–1960.

Oil absorption power: it was measured according to the provision of JIS P 810–1959.

Further, to 100 parts of the composition obtained in this Example, 90 parts of clay, 10 parts of satin white, 0.36 part of a dispersing agent and 0.03 part of an antifoaming agent were added to give a compositon for pigment coating. The composition so prepared was coated on the finest paper. IGT pick strength of the Table 5

|  | Viscosity change with the lapse of time | | Dependence on shearing rate | |
|---|---|---|---|---|
|  | Lapsed time hour | Falling time second | Number of revolution r.p.m. | Viscosity cP |
| Example 20 | 2 | 40 | 6 | 205 |
|  | 6 | 44 | 12 | 197 |
|  | 12 | 47 | 30 | 182 |
|  | 24 | 51 | 60 | 172 |
|  | 36 | 55 | — | — |
| Control 4 | 2 | 39 | 6 | 2,800 |
|  | 6 | 57 | 12 | 1,900 |
|  | 12 | 96 | 30 | 1,100 |
|  | 24 | 123 | 60 | 760 |
|  | 36 | Separation into layers | — | — |
| Control 5 | 2 | 40 | 6 | 4,030 |
|  | 6 | 80 | 12 | 2,260 |
|  | 12 | 150 | 30 | 1,220 |
|  | 24 | Gelation | 60 | 710 |
|  |  | (White precipitate in part) |  |  |
|  | 36 | Gelation | — | — |

Employing the composition obtained in this Example, the sizing of the surface of the finest paper was carried out as follows:

The finest paper unfinished having a basis weight of 65 g./m.$^2$ was coated with the composition in an amount of 1.27 g./m.$^2$ in solid by means of a Dixon coater. The coated paper was then subjected to super calender treatment under a line pressure of 100 kg./cm.

coated paper was 170 cm./sec.

EXAMPLES 21 TO 25 AND CONTROLS 6 AND 7

The same procedure as in Example 20 was repeated except that the emulsion prepared by employing the modified PVA shown in Table 6 was employed instead of the emulsion employed in Example 20.

The results are shown in Table 6.

Table 6

| | Modified PVA | | |
|---|---|---|---|
| | *Methanol : Monomer by weight | Sodium allylsulfonate content % by mole | Degree of hydrolysis in vinyl acetate unit % by mole |
| Example 21 | 5 : 95 | 1.5 | 98.6 |
| Example 22 | 10 : 90 | 2.0 | 90.0 |
| Example 23 | 25 : 75 | 2.7 | 99.0 |
| Example 24 | 30 : 70 | 3.5 | 88.5 |
| Example 25 | 90 : 10 | 2.0 | 98.5 |
| Control 6 | 50 : 50 | 0.3 | 98.3 |
| Control 7 | 30 : 70 | 9.1 | 98.5 |

| | Viscosity change with the lapse of time (Falling time) Lapsed time (hour) | | | | | Dependence on shearing rate (Viscosity) Number of revolution (r.p.m.) | | | | |
|---|---|---|---|---|---|---|---|---|---|---|
| | 2 | 6 | 12 | 24 | 36 | 6 | 12 | 30 | 60 | 120 |
| | second | | | | | cP | | | | |
| Example 21 | 51 | 54 | 61 | 65 | 69 | 350 | 325 | 305 | 295 | 270 |
| Example 22 | 69 | 72 | 77 | 80 | 81 | 500 | 460 | 415 | 360 | 320 |
| Example 23 | 49 | 51 | 54 | 57 | 62 | 250 | 210 | 190 | 175 | 160 |
| Example 24 | 58 | 60 | 62 | 67 | 70 | 460 | 430 | 400 | 370 | 360 |
| Example 25 | 30 | 41 | S | S | S | 140 | 130 | 127 | 120 | 110 |
| Control 6 | S | S | S | S | S | Measurement is impossible due to separation into layers. | | | | |
| Control 7 | 21 | S | S | S | S | Measurement is impossible due to sepa- | | | | |

Table 6-continued ration into layers.

(Note) In Table, reference "S" shows the separation into layers.
*"Methanol : Monomer" shows the ratio of methanol to monomer in copolymerizing vinyl acetate and sodium allylsulfonate.

EXAMPLE 26

The same procedure as in Example 20 was repeated except that a hydrolyzed vinyl acetate-sodium 2-methylallylsulfonate copolymer was employed as the emulsifier instead of the hydrolyzed vinyl acetate-sodium allylsulfonate copolymer in the preparation of the emulsion.

The results were similar to those obtained in Example 20.

EXAMPLE 27

The same polymerization vessel as in Example 20 was charged with 320 parts of vinyl acetate, 130 parts of methanol, 25 parts of water, 15 parts of a 30 % aqueous solution of sodium ethylenesulfonate and 2.8 parts of azobisisobutylonitrile. After carrying out the polymerization at a temperature of 70° C. for 3 hours, 2.8 parts of the aqueous solution of sodium ethylenesulfonate was further added to the vessel and the polymerization was further continued for 5 hours. Vinyl acetate-sodium ethylenesulfonate copolymer having 2.3 % by mole of sodium ethylenesulfonate unit was obtained. Then the copolymer was hydrolyzed by a conventional method to give a modified PVA of which degree of hydrolysis in vinyl acetate unit was 98.5 % by mole.

Employing the modified PVA so prepared, the emulsion of butadiene-styrene copolymer was prepared and then admixed with the hydrolyzed vinyl acetate-maleic acid copolymer to give an aqueous resinous composition in the same manner as in Example 20.

The results were similar to those obtained in Example 20.

EXAMPLES 28 TO 35

The same procedure as in Example 20 was repeated except that each emulsion shown in Table 7 was employed instead of the emulsion of butadiene-styrene copolymer.

The results are shown in Table 7.

Table 7

| | Monomer | | Polymer composition | Viscosity change with the lapse of time (Falling time) | | | | | Dependence on shearing rate (Viscosity) | | | | |
|---|---|---|---|---|---|---|---|---|---|---|---|---|---|
| | | | | Lapsed time (hour) | | | | | Number of revolution (r.p.m.) | | | | |
| | Kind | Amount | | 2 | 6 | 12 | 24 | 36 | 6 | 12 | 30 | 60 | 120 |
| | — | part | molar ratio | second | | | | | cP | | | | |
| Example 28 | Butadiene-1,3 | 1800 | 75.5 | 40 | 43 | 46 | 50 | 55 | 205 | 197 | 182 | 170 | 160 |
| | Styrene | 1100 | 22.5 | | | | | | | | | | |
| | Acrylic acid | 100 | 2.0 | | | | | | | | | | |
| Example 29 | Butadiene-1,3 | 1800 | 75.2 | 40 | 45 | 46 | 51 | 58 | 210 | 200 | 195 | 180 | 170 |
| | Styrene | 1100 | 21.8 | | | | | | | | | | |
| | Methacrylic acid | 100 | 3.0 | | | | | | | | | | |
| Example 30 | Butadiene-1,3 | 1800 | 59.0 | 39 | 42 | 47 | 51 | 55 | 200 | 190 | 180 | 172 | 165 |
| | Acrylonitrile | 1200 | 41.0 | | | | | | | | | | |
| Example 31 | Butadiene-1,3 | 1800 | 72.9 | 45 | 49 | 55 | 57 | 65 | 210 | 197 | 190 | 170 | 168 |
| | Acrylonitrile | 600 | 9.5 | | | | | | | | | | |
| | Styrene | 600 | 17.6 | | | | | | | | | | |
| Example 32 | Butadiene-1,3 | 1800 | 57.3 | 47 | 52 | 58 | 63 | 67 | 220 | 205 | 195 | 182 | 170 |
| | Acrylonitrile | 1100 | 40.2 | | | | | | | | | | |
| | Methacrylic acid | 100 | 2.5 | | | | | | | | | | |
| Example 33 | Butadiene-1,3 | 1800 | 73.0 | 40 | 43 | 46 | 49 | 58 | 200 | 192 | 180 | 170 | 170 |
| | Methyl methacrylate | 1200 | 27.0 | | | | | | | | | | |
| Example 34 | Butadiene-1,3 | 1800 | 71.5 | 45 | 50 | 53 | 59 | 66 | 230 | 215 | 200 | 190 | 184 |
| | Methyl methacrylate | 1100 | 26.0 | | | | | | | | | | |
| | Acrylic acid | 100 | 2.5 | | | | | | | | | | |
| Example 35 | 2-Methylbutadiene-1,3 | 1800 | 58.7 | 45 | 49 | 52 | 57 | 63 | 205 | 195 | 185 | 176 | 168 |
| | Styrene | 1200 | 41.3 | | | | | | | | | | |

Employing each composition obtained in Examples 28 to 35, the clear coating and pigment coating were carried out in the same manner as in Example 20. The results were similar to those obtained in Example 20.

EXAMPLES 36 TO 39

The same procedure as in Example 20 was repeated except that each water-soluble polymeric material shown in Table 8 was employed instead of the hydrolyzed vinyl acetate-maleic acid copolymer.

The results are shown in Table 8.

Table 8

| | Water-soluble polymeric material | Mixing ratio* | Viscosity change with the lapse of time (Falling time) | | | | Dependence on shearing rate (Viscosity) | | | |
|---|---|---|---|---|---|---|---|---|---|---|
| | | Emulsion : polymeric material | Lapsed time (hour) | | | | Number of revolution (r.p.m.) | | | |
| | Kind | | 2 | 6 | 12 | 24 | 6 | 12 | 30 | 60 |
| | — | by weight | second | | | | cP | | | |
| Example 36 | Methyl cellulose | 3.5 : 6.5 | 85 | 85 | 89 | 92 | 2620 | 2410 | 2050 | 1970 |
| Example 37 | Carboxymethyl cellulose | 3.5 : 6.5 | 62 | 64 | 68 | 70 | 840 | 800 | 760 | 720 |
| Example 38 | Oxidized starch | 3.5 : 6.5 | 24 | 24 | 25 | 27 | 46 | 44 | 40 | 37 |
| Example 39 | Dextrin | 3.5 : 6.5 | 39 | 40 | 41 | 43 | 81 | 76 | 72 | 68 |

(Note) The solid content of the composition employed in measurement is 7.5 %.
*"Mixing ratio" shows the ratio of the solid content of emulsion to water-soluble polymeric material.

What we claim is:

1. An aqueous resinous composition consisting essentially of (1) an aqueous emulsion of acrylic polymer, which is prepared by emulsion-polymerizing at least one acrylic monomer selected from the group consisting of an acrylic acid ester, acrylic acid, acrylamide, N-methylolacrylamide, a methacrylic acid ester, methacrylic acid, methacrylamide and N-methylolmethacrylamide, or an aqueous emulsion of a butadiene polymer which is prepared by emulsion-copolymerizing a butadiene monomer with at least one monomer selected from the group consisting of styrene, an acrylic acid ester, acrylic acid, acrylonitrile, acrylamide, a methacrylic acid ester, methacrylic acid, methacrylonitrile and methacrylamide in an aqueous medium in the presence of a hydrolyzed vinyl acetate-alkali metal olefin-sulfonate copolymer containing 0.5 to 7% by mole of an alkali metal olefinsulfonate unit and having a degree of hydrolysis in the vinyl acetate unit of at least 65% by mole as an emulsifier to form a first emulsion, and (2) a water-soluble polymeric material which is admixed with the first emulsion; the weight ratio of the solid content of said first emulsion to said polymeric material falling within the range of 1 : 9 to 9 : 1.

2. The composition of claim 1, wherein said weight ratio falls within the range of 2 : 8 to 8 : 2.

3. The composition of claim 1, wherein said water-soluble polymeric material is one selected from the group consisting of polyvinyl alcohol having a degree of hydrolysis of not less than 50 % by mole, starches, methyl cellulose, carboxymethyl cellulose, hydroxymethyl cellulose, hydroxyethyl cellulose, polyethylene oxide, polyvinyl pyrrolidone, polyacrylic acid, alkali or ammonium salts of polyacrylic acid, polyacrylamide and casein.

4. The composition of claim 1, wherein said hydrolyzed vinyl acetate-alkali metal olefinsulfonate copolymer is a member selected from the group consisting of hydrolyzed vinyl acetate-alkali metal vinylsulfonate copolymer, hydrolyzed vinyl acetate-alkali metal allylsulfonate copolymer and hydrolyzed vinyl acetate-alkali metal 2-methylallylsulfonate copolymer.

5. The composition of claim 1, wherein said acrylic or methacrylic acid ester is selected from the group consisting of methyl acrylate, ethyl acrylate, propyl acrylate, butyl acrylate, 2-ethylhexyl acrylate, 2-hydroxyethyl acrylate, methyl methacrylate, ethyl methacrylate, propyl methacrylate, butyl methacrylate, 2-ethylhexyl methacrylate and 2-hydroxyethyl methacrylate.

6. The composition of claim 1, wherein said butadiene monomer is at least one member selected from the group consisting of butadiene-1,3, 2-methylbutadiene-1,3, 2,3-dimethylbutadiene-1,3 and 2-chlorobutadiene-1,3.

* * * * *